United States Patent [19]
Allison

[11] Patent Number: 5,908,280
[45] Date of Patent: Jun. 1, 1999

[54] WHEEL LIFT APPARATUS FOR VEHICLE TOWING AND RELATED METHODS

[76] Inventor: James Allison, 5257 Summergate Dr., Charlotte, N.C. 28226

[21] Appl. No.: 08/841,192

[22] Filed: Apr. 29, 1997

[51] Int. Cl.[6] ........................................................ B60P 3/12
[52] U.S. Cl. ........................... 414/563; 280/402; 414/428
[58] Field of Search ..................................... 414/546, 563, 414/426, 427, 428, 429, 430, 815, 800; 280/402; 254/2 R, 93 R

[56] References Cited

U.S. PATENT DOCUMENTS

| | | |
|---|---|---|
| 1,817,220 | 8/1931 | Young . |
| 1,962,127 | 6/1934 | Balkema et al. . |
| 2,183,478 | 12/1939 | Holmes et al. . |
| 2,252,534 | 8/1941 | Trotter . |
| 2,283,443 | 5/1942 | Klein . |
| 2,541,582 | 2/1951 | Hawkins . |
| 2,714,470 | 8/1955 | Marcus et al. . |
| 2,985,317 | 5/1961 | Bannister . |
| 3,182,829 | 5/1965 | Wagner . |
| 3,285,443 | 11/1966 | Gaumont . |
| 3,434,607 | 3/1969 | Nelson . |
| 3,434,608 | 3/1969 | Nelson . |
| 3,559,827 | 2/1971 | Schler . |
| 3,667,631 | 6/1972 | Bishop . |
| 3,690,482 | 9/1972 | Gaumont . |
| 3,700,123 | 10/1972 | Corley, Jr. . |
| 3,700,125 | 10/1972 | Aquila . |
| 3,841,506 | 10/1974 | Smith . |
| 3,871,535 | 3/1975 | Fenske . |
| 3,924,763 | 12/1975 | Pigeon . |
| 3,951,280 | 4/1976 | Peck . |
| 4,000,823 | 1/1977 | Aquila . |
| 4,034,873 | 7/1977 | Haring . |
| 4,068,876 | 1/1978 | Muellner . |
| 4,186,938 | 2/1980 | Youngblood . |
| 4,264,262 | 4/1981 | LoCodo . |
| 4,318,657 | 3/1982 | Znidaric . |
| 4,383,807 | 5/1983 | Bubik . |
| 4,384,817 | 5/1983 | Peterson . |
| 4,451,193 | 5/1984 | Cannon, Jr. et al. . |
| 4,473,237 | 9/1984 | Lind . |
| 4,473,334 | 9/1984 | Brown . |
| 4,557,496 | 12/1985 | Sill . |
| 4,564,207 | 1/1986 | Russ . |
| 4,573,857 | 3/1986 | Porter, Sr. et al. . |
| 4,674,943 | 6/1987 | Nespor . |
| 4,678,392 | 7/1987 | Capers et al. . |
| 4,679,978 | 7/1987 | Holmes et al. . |
| 4,737,066 | 4/1988 | Allison, Jr. . |
| 4,778,333 | 10/1988 | Youmans et al. . |
| 4,798,509 | 1/1989 | Bubik . |

(List continued on next page.)

FOREIGN PATENT DOCUMENTS

| | | | |
|---|---|---|---|
| 2069809 | 12/1992 | Canada | ................................. 280/402 |
| 1 142 688 | 9/1959 | Germany . | |
| 26 08 523 | 9/1977 | Germany . | |
| 56-51647 | 5/1981 | Japan . | |
| 895691 | 5/1962 | United Kingdom . | |

OTHER PUBLICATIONS

*Tow Times*, vol. 1 No. 5, Dec. 1983.

*Primary Examiner*—Frank E. Werner
*Attorney, Agent, or Firm*—Alston & Bird LLP

[57] ABSTRACT

A wheel lift apparatus for tow vehicles includes a boom extending from a tow vehicle and a cross arm connected with the boom. The wheel lift apparatus also preferably includes a pair of receivers including an inclined face mounted on opposite end portions of the cross arm and a pair of pivot members mounted on the end portions. A pair of swing arms, each of which preferably has a swivel leg, a wheel support leg and a distal leg, is mounted on the pivot members. The swing arms are pivotally movable between a storage position in which the wheel support legs each extend between the boom and one of the pivot members and towing position in which the distal legs are spaced apart from the cross arm such that the cross arm, wheel support leg and distal leg, and preferably the inclined face, define a receptacle for receiving and supporting a wheel of a vehicle for lift towing. Methods of wheel lift towing are also provided.

28 Claims, 5 Drawing Sheets

U.S. PATENT DOCUMENTS

| | | |
|---|---|---|
| 4,836,737 | 6/1989 | Holmes et al. . |
| 4,921,268 | 5/1990 | Dyer . |
| 4,929,142 | 5/1990 | Nespor . |
| 4,968,052 | 11/1990 | Alm et al. . |
| 5,013,209 | 5/1991 | DeMichele et al. .................... 414/563 |
| 5,061,147 | 10/1991 | Nespor . |
| 5,271,705 | 12/1993 | Pijanowski .............................. 414/563 |
| 5,326,216 | 7/1994 | Russ . |
| 5,575,606 | 11/1996 | Kiefer et al. ........................... 414/563 |

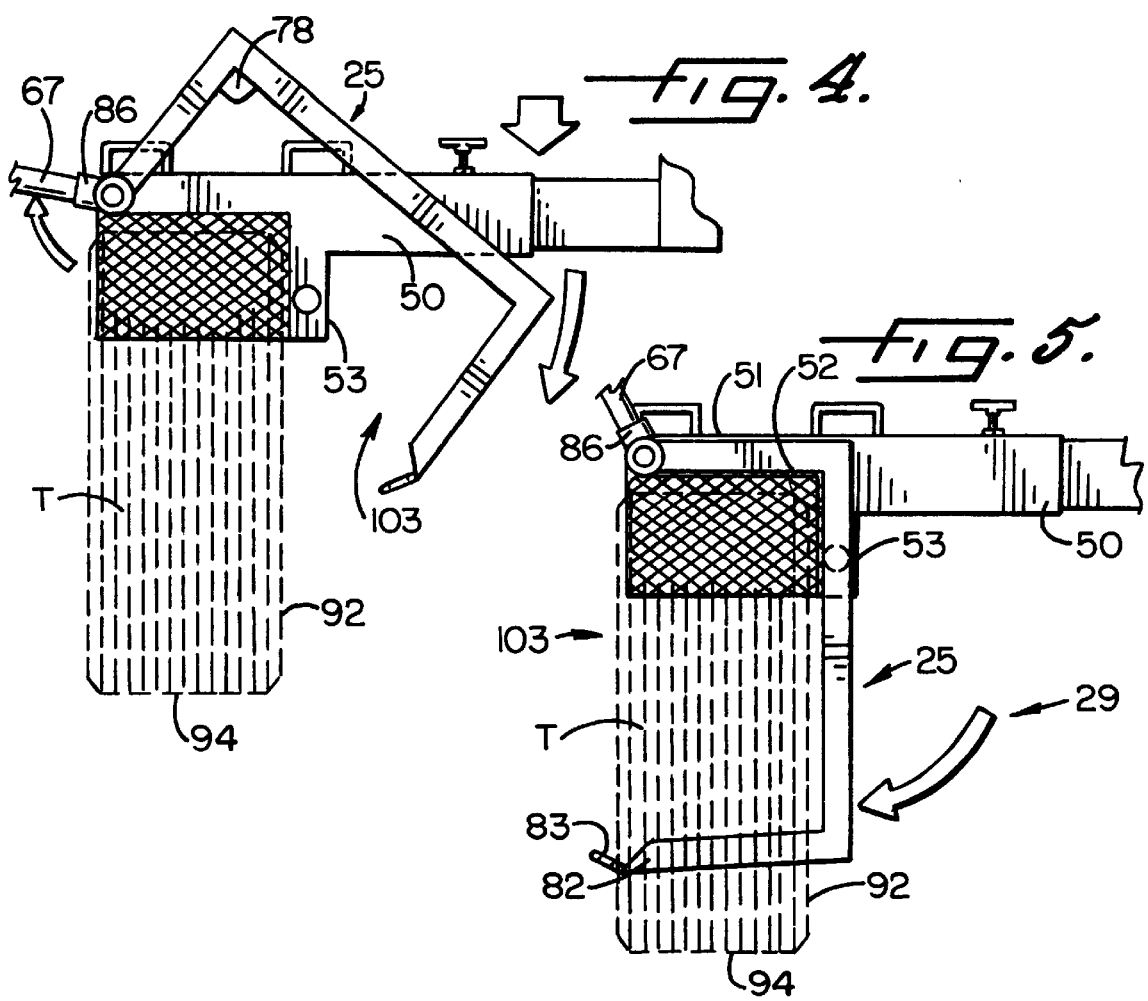
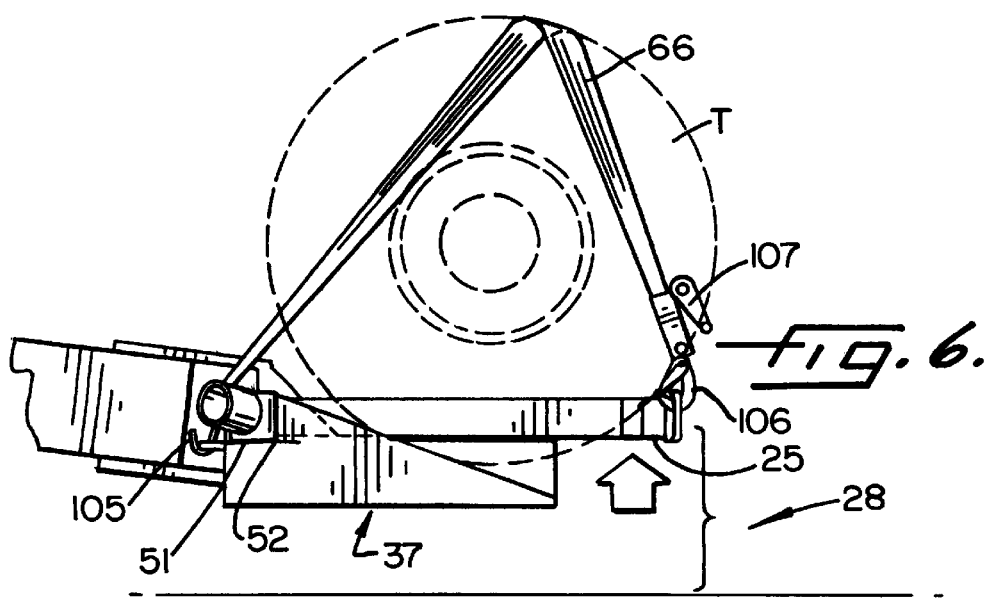

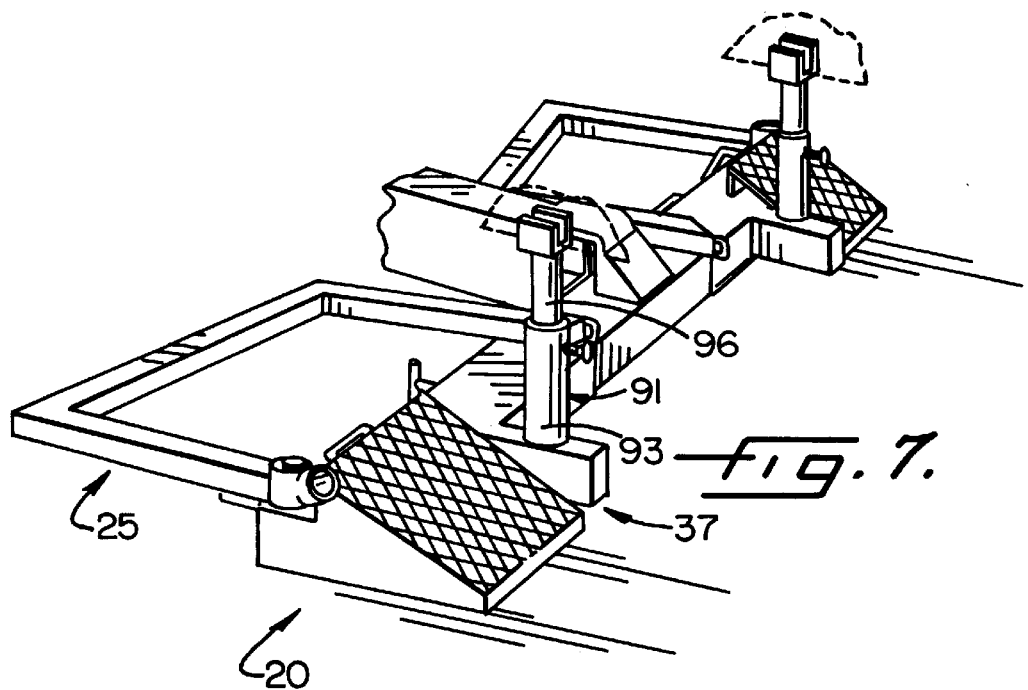
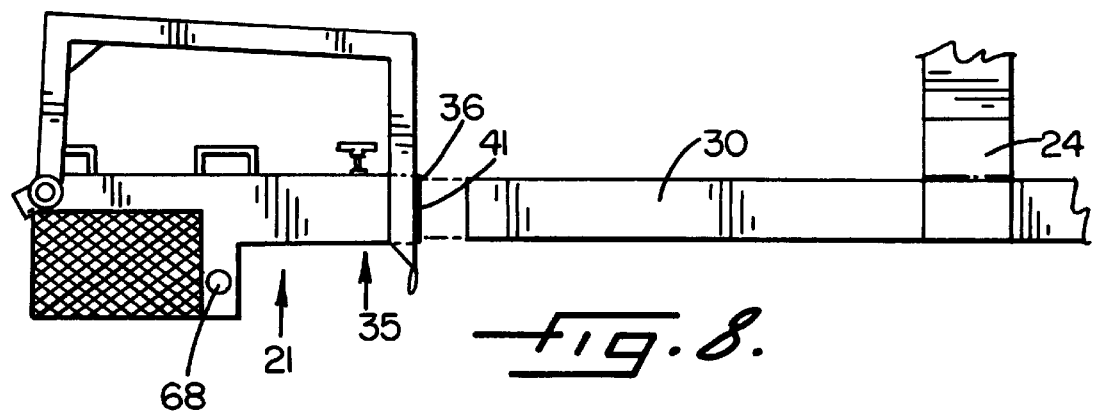
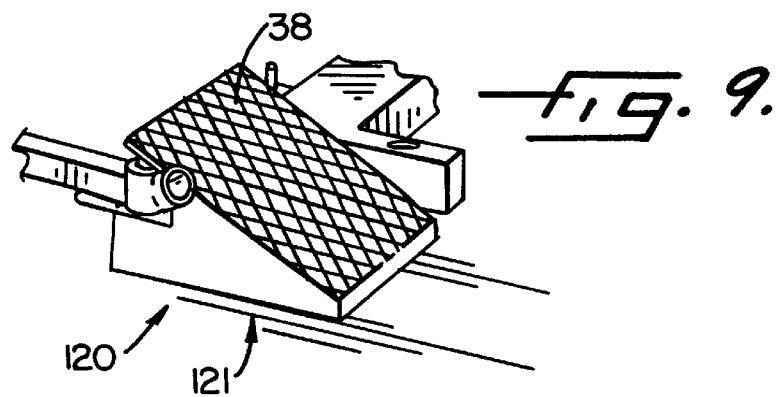

WHEEL LIFT APPARATUS FOR VEHICLE TOWING AND RELATED METHODS

FIELD OF THE INVENTION

The present invention relates to an apparatus for towing vehicles and more particularly to an apparatus and related methods used with tow vehicles and the like to provide an efficient means to tow a vehicle.

BACKGROUND OF THE INVENTION

Tow trucks or wreckers in the past included large cranes or boom arms mounted in truck beds which utilized a hoist mechanism to lift an end of a vehicle for towing. The hoist mechanisms employed various types of slings and chain arrangements attached with bumpers, frames or bodies of the vehicle for lifting and towing. Vehicles manufactured at the time of these early tow trucks generally had bumpers, frame assemblies and vehicle bodies manufactured from heavy gauge steel or sturdy materials which were strong enough to support the vehicle during towing by such sling and chain lifting arrangements.

Cars in more recent years typically have been manufactured with bumpers, frames and bodies formed of lighter weight steels and synthetic materials. Such lighter weight materials have generally been utilized to increase fuel efficiency, lower manufacturing costs and provide shock-collapsible bumpers and flexible air dams. As a consequence of these developments, the rigidity of the vehicle bumpers, air dams and other structures is significantly less than in prior vehicles. Towing with conventional sling and chain arrangements has often damaged the bumpers, frames or bodies of these newer vehicles.

To address these problems, various tow truck and lifting apparatus designs have been attempted to lift and tow a vehicle by the wheels or tires instead of by the frame, body or bumper. For example, towing apparatus have been employed utilizing a straight bar or double-legged bar in conjunction with a towing boom and restraining straps to cradle part of a wheel or tire for towing. These straight bar and double-legged bar devices which are inserted in grooves in the towing boom or a connected cross bar have also caused damage and interference with the rear surfaces of a tow vehicle during turning. During turning, the straight bar or double leg bars or arms are pushed sufficiently forward within the wheel holding devices such that a portion of the arm or bar reaches the bumper face of the tow vehicle. Other wheel lift towing devices have been attempted using a straight bar or two-legged curved bar which is hinged or pivoted to rotate from a towing boom into a towing position to engage a part of a tire in conjunction with the towing boom for towing a vehicle. An example of such rotating bars can be seen in U.S. Pat. No. 4,678,392 to Capers et al.

Many of these towing devices, including devices utilizing straight and double-legged bars, claw, collar and sliding lift mechanisms have required extensive set-up of the towing device and the tow truck at the towing site, often including set-up prior to positioning the tow truck adjacent the vehicle to be towed. Such set-up, in some of these designs, has generally required sliding the straight or curved bar into a groove of a towing boom or connected cross bar prior to positioning of the tow truck. One such wheel lift towing apparatus is depicted in U.S. Pat. No. 4,573,857 to Porter. Other types of towing devices have included claws or collars which slide into an arm attached to a towing boom and are designed to cradle the wheels, as shown, for example, in U.S. Pat. No. 4,968,052 to Alm et al.

The set-up involved in many of these towing devices required the tow truck operator to transport the towing device in a dismantled state, dismount the tow truck, and then assemble and/or extensively set-up the device. Towing devices requiring set-up were typically transported on the tow truck in an unassembled condition, thus increasing the time of utilization and the possibility of losing elements of the towing devices. Such set-up could include, for example, sliding the towing bar it into the towing boom or cross bar or assembling pieces of the towing device at the towing site. Then, the operator had to re-enter the truck, position the truck, and dismount the truck again to secure the towing apparatus. Such extensive set-up and assembly requirements often increased the difficulty of attaching towing devices to vehicle wheels, especially where the vehicle to be towed required quick removal from a highway, bridge, parking garage or space or other dangerous or confined area.

Another type of towing device has been attempted utilizing remote operation such as the device depicted in U.S. Pat. No. 4,473,334 to Brown ("Brown"). Brown describes lifting and towing equipment including a pair of two-pronged, wheel engaging claw members, each of which rotates by remote operation into a towing position. The device is activated by contacting the tire with the prong closest to the towing truck such that the rear prong is rotated into place around the tire. Such a remotely operated towing apparatus can be difficult to maneuver and can require movement and alignment of the entire tow truck to position the wheel lifting apparatus.

There is therefore a need for a wheel lift towing apparatus which easily can be positioned to lift various size tires of a vehicle for lift towing and which minimizes set-up prior to alignment of the towing device and tow truck with the vehicle to be towed. There is also a need for an improved lift towing apparatus which can be transported in an assembled condition to and from a towing site. There is a still further need for a lift towing apparatus which will not damage or interfere with the tow vehicle during turning or towing of a vehicle.

SUMMARY OF THE INVENTION

It is an object of the invention to provide a wheel lift apparatus for towing with a tow vehicle which can be easily positioned and aligned with various sizes and spacings of tires or wheels of vehicles.

It is another object to provide a wheel lift apparatus for towing with a tow vehicle which can be transported in an assembled condition to and from a towing site.

It is another object to provide a wheel lift apparatus for towing vehicles which can be transported on a tow truck without requiring extensive set-up of the wheel lift apparatus prior to alignment of the wheel lift towing apparatus with the vehicles for towing.

It is a still further object to provide a wheel lift apparatus for towing vehicles which does not interfere with or damage the rear of a tow vehicle during towing or turning.

In accordance with the present invention, these and other objects and advantages are achieved by provision of a wheel lift apparatus for towing vehicles which includes a wheel securing apparatus including an adjustable wheel receiving portion and a pivotable swing arm which support and lift a wheel of vehicle for towing with a tow vehicle. The wheel lift apparatus can be transported to the towing site in an assembled condition and does not require extensive set-up to align and secure various size wheels or tires on vehicles of a variety of wheel spacings. The wheel lift apparatus includes a boom connected with a tow vehicle and a cross arm connected with the boom and having a pair of the wheel securing apparatus connected on opposite end portions thereof.

In one aspect of the present invention, the wheel lift apparatus for towing vehicles with a tow vehicle comprises a boom which extends from a tow vehicle and a cross arm having a medial portion attached to the boom. The cross arm also includes a pair of end portions on opposite sides of the medial portion. A pivot member is mounted on each of the end portions of the cross arm. The wheel lift apparatus includes a pair of swing arms, each arm being mounted on a respective one of the pair of pivot members. Each of the swing arms preferably includes a swivel leg, a wheel support leg and a distal leg. Each swivel leg has a first end pivotally mounted to a respective one of the pivot members and a second end connected to a first end of a respective one of the wheel support legs. Each wheel support leg includes a second end connected to the distal leg.

The wheel lift apparatus also includes a pair of receivers each of which includes a wheel receiving portion. Each of the wheel receiving portions preferably has an inclined face for engaging a tire or wheel during lifting. Each of the receivers is also preferably slidably received on the cross arm and movable between a receiver towing position and a receiver storage position along the cross arm.

The swing arms are each pivotally movable between a storage position in which the wheel support legs each extend between the boom and one of the pivot members and a towing position in which each of the distal legs are spaced apart from the cross arm such that the wheel support leg, the distal leg and preferably the wheel receiving portion define a receptacle for receiving and supporting a wheel of a vehicle for towing. In the receiver storage position, each of the swing arms is constrained from pivoting by abuttingly contacting the boom. Each of the receivers further, preferably, includes a bar which extends laterally from the cross arm and which supports a respective one of the swing arms in the towing position. Further, each of the swing arms is preferably restrained in the towing position by the wheel receiving portion. The swing arms and thus the wheel lift apparatus, therefore, do not interfere with or damage the rear surface of the tow vehicle, including the bumper during towing or turning.

The wheel lift apparatus, according to the present invention, can be transported on a tow vehicle with each of the swing arms in the storage position. The wheel lift apparatus thereby can be aligned with the tires or wheels of a vehicle for lifting without requiring assembly or extensive setup of the wheel lift apparatus prior to alignment with the tires or wheel of a vehicle. This enables the wheel lift apparatus to be aligned with vehicles in constrained spaces such as parking lots or garages and dangerous places such as highways. The wheel lift apparatus thus enhances the safety of the tow vehicle operator.

In another aspect of the present invention methods of lifting a vehicle for towing with a wheel lift apparatus described herein can be provided comprising the following steps. One of the pair of swing arms is positioned in a storage position such that a respective one of the wheel receiving portions is accessible. The wheel receiving portion is then positioned adjacent a proximal tread face of a tire on a vehicle to be lifted for towing. The swing arm is then pivoted from the storage position into the towing position such that said distal leg pivots around a side portion of said tire facing the underside of the vehicle to the towing position on the underside of the vehicle. In the towing position, the distal leg is proximal the distal tread face of the tire and preferably extends along the width of the distal tread face. The wheel lift apparatus can then be raised such that the tire is supported in a receptacle defined by the distal leg, the wheel support leg and the wheel receiving portion. After towing, the wheel can be released by lowering the wheel lift apparatus and rotating the swing arm to the storage position.

BRIEF DESCRIPTION OF THE DRAWINGS

For a more complete understanding of this invention reference should be now had to the embodiments illustrated in greater detail in the accompanying drawings and described below by way of examples of the invention.

FIG. 4 is a top view of a wheel securing apparatus of the wheel lift towing apparatus of FIG. 1 being pivoted into a towing position around a wheel of a vehicle to be towed.

FIG. 5 is a top view of the wheel securing apparatus of the wheel lift towing apparatus of FIG. 1 securing a wheel in the towing position.

FIG. 6 is a side view of the wheel lift apparatus of FIG. 1 securing the wheel of the vehicle in a raised towing position.

FIG. 7 is a perspective view of the wheel lift towing apparatus having vehicle frame lifting posts.

FIG. 8 is an exploded top view of the wheel lift towing apparatus having the receiver disconnected from the cross arm of FIG. 1.

FIG. 9 is a perspective view of an alternative embodiment of a wheel securing apparatus of a wheel lift towing apparatus according to the present invention.

DETAILED DESCRIPTION

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout.

Figure 1:
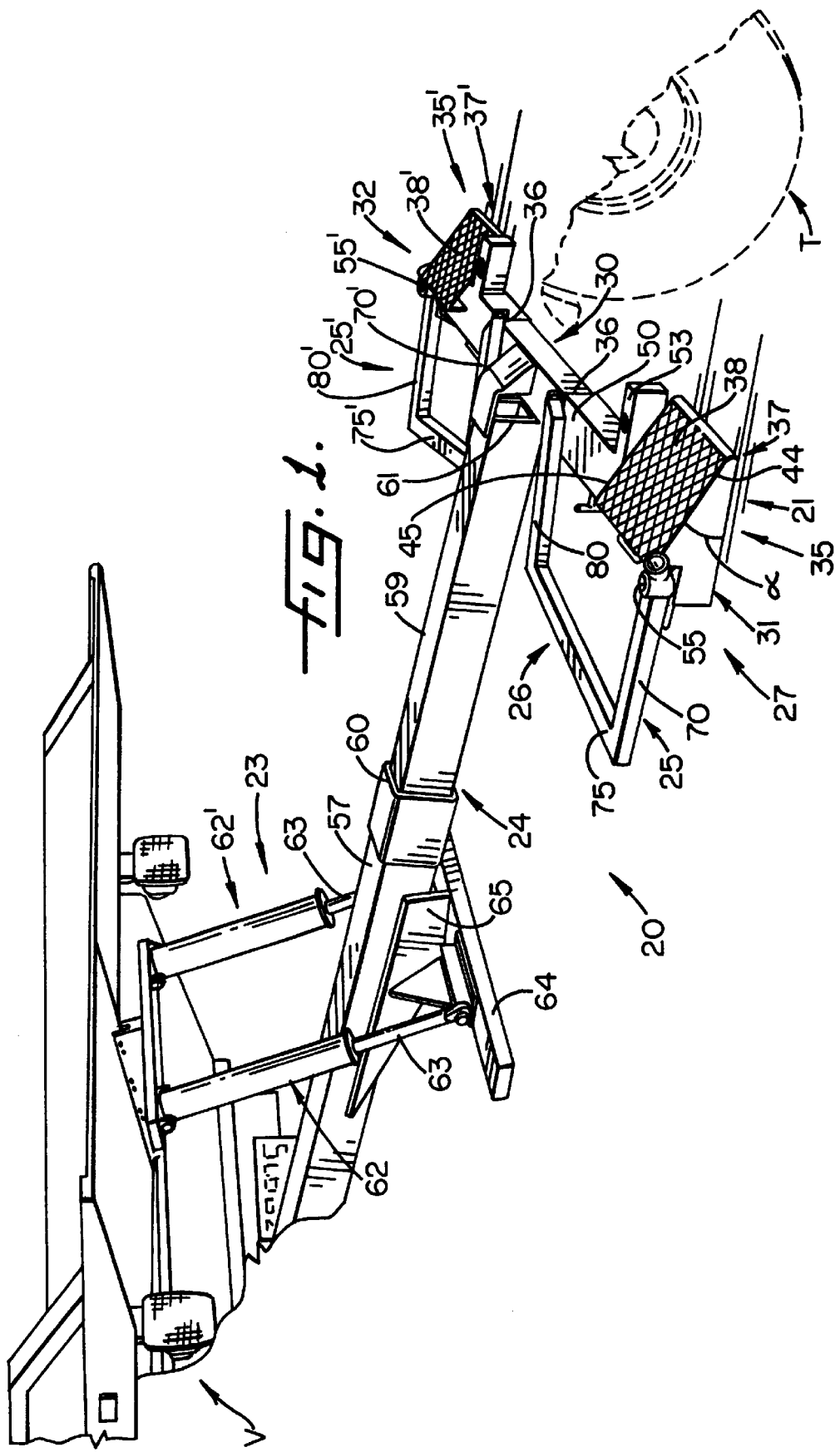
FIG. 1 is a partial perspective view of a tow vehicle having a wheel lift towing apparatus according to the present invention positioned adjacent a tire of a vehicle to be towed.

Referring now to FIG. 1, a wheel lift apparatus 20 for use in towing vehicles according to the present invention is depicted. The wheel lift apparatus 20 includes a boom 24 connected with and extending from the rear of the tow vehicle or truck V and a cross arm 30 connected with the boom 24. The wheel lift apparatus 20 can be moved between a lowered position 27 (FIG. 1) and a raised position 28 (FIG. 6) by a lifting mechanism 23 connected with the boom 24 and the tow truck V. Still referring to FIG. 1, the wheel lift apparatus 20 further includes a pair of receivers 35 and 35', each of which has a connecting portion 36, 36' slidably connected on one of a respective opposite ends 31 and 32 of the cross arm 30. Each of the receivers 35, 35' includes a wheel receiving portion 37, 37' having an incline face 38, 38'. The wheel lift apparatus 20 further includes a pair of pivot members 55, 55', each of which is connected on a respective receiver 35, 35' and a pair of swing arms 25, 25', each of which is pivotally mounted on a respective one of the pivot members 55, 55'. Each of the swing arms 25, 25' is pivotally movable between a storage position 26, as depicted in FIG. 1, and a towing position 29, as illustrated in FIG. 5. Each of the swing arms 25, 25' includes a respective swivel leg 70, 70' a wheel support leg 75, 75' and a distal leg 80, 80' (FIG. 1). The wheel lift apparatus 20 includes a wheel securing apparatus 21 defined by a respective one of the receiver 35, swing arm 25, and pivot member 55 for securing a wheel for lifting and towing as described herein.

The wheel lift apparatus 20 depicted in FIG. 1 includes the receivers 35, 35', pivot members 55, 55' and swing arms 25, 25' which are mirror images of one another. As such, these elements of the wheel lift apparatus 20, are described with respect to FIGS. 1 through 8 in further detail by referring to a single receiver 35, pivot member 55 and swing arm 25 herein. The discussion contained herein applies equally to the respective mirror element and is excluded for the sake of brevity.

Referring to FIG. 1 in more detail, the wheel lift apparatus 20 is attached to a conventional tow vehicle V and is positioned adjacent a tire T of a vehicle to be towed. Only a portion of the conventional tow truck V is depicted in FIG. 1. Conventional tow vehicles or trucks V are known to one of ordinary skill in the art and are not therefore described in further detail herein. One example of a conventional tow vehicle can be seen in FIG. 1 of U.S. Pat. No. 4,737,066 (the '066 patent), a prior patent to the present applicant. The description contained therewith is incorporated by reference herein. The wheel lift apparatus 20 according to the present invention is not disclosed in the '066 patent.

Still with respect to FIG. 1, the boom 24 includes an elongated connector arm 57 connected with the rear of the tow truck 21 at a proximal end. A distal end 60 of the elongated connector arm 57 slidably receives an extender arm 59 therein. A distal end 61 of the boom 24 may be connected with a medial portion 33 of the cross arm 30, preferably, by a pivot pin or other suitable means. The section of the cross arm 30 between the end portions 31 and 32 defines a longitudinal axis of the cross arm 30. The cross arm 30 and the boom 24 are depicted as formed of steel or a like material. The cross arm 30 and boom 24 can also be formed of various suitable materials having strength and rigidity properties sufficient to withstand loading during lifting and towing of vehicles. Such suitable materials are those which can withstand cyclical loading and unloading without failure, structural weakening or excessive fatigue. The boom 24 and cross arm 30 are subject to various stresses and must withstand forces of shear, torque and bending. The wheel lift apparatus 20 can be provided including various configurations of booms connected with various cross arms. The boom 24 can alternatively be provided having an extendable boom movable to a plurality of lengths from the rear of the truck body 11. Also, the cross arm 30 can be rotatably, pivotally or otherwise connected with the boom 24 to provide flexibility in aligning of the wheel lift apparatus 20 with a vehicle to be towed if desired.

Still referring to FIG. 1, a hydraulic lifting mechanism 23 is depicted. The lifting mechanism 23 includes a pair of lift arms 62, 62' which include hydraulic extenders 63, 63' connected with a cross bar 64. The cross bar includes a cradle 65 positioned beneath the boom 24 to support and lift the boom 24. The hydraulic lift arms 62, 62' are extended in the lowered position 27, illustrated in FIG. 1, by hydraulic actuators and can be retracted into the raised position 28 thereby lifting the wheel lift apparatus 20 (FIG. 6). Such hydraulic lifting mechanisms are known to one of skill in the art and are not described in further detail herein. Various other lifting mechanism including other mechanical, electromechanical, servo-motor mechanisms and the like, or other hydraulic means, can be utilized to move the wheel lift apparatus 20 between the lowered position 27 and the raised position 28 for alignment, lifting and towing.

As depicted in FIGS. 1 through 3 and 8, the wheel securing apparatus 21 is connected with the cross arm 30 by a hollow opening 41 in a connecting position 36 of the receivers 35 which are slidably mounted on a respective one of the ends 31 of the cross arm 30. As mentioned, the wheel securing apparatus 21, 21', including the receivers 35, 35' are identical and only one receiver 35 is described herein in further detail. The discussion of the other wheel securing apparatus 21 including the receiver 35' is incorporated by reference.

Figure 2:
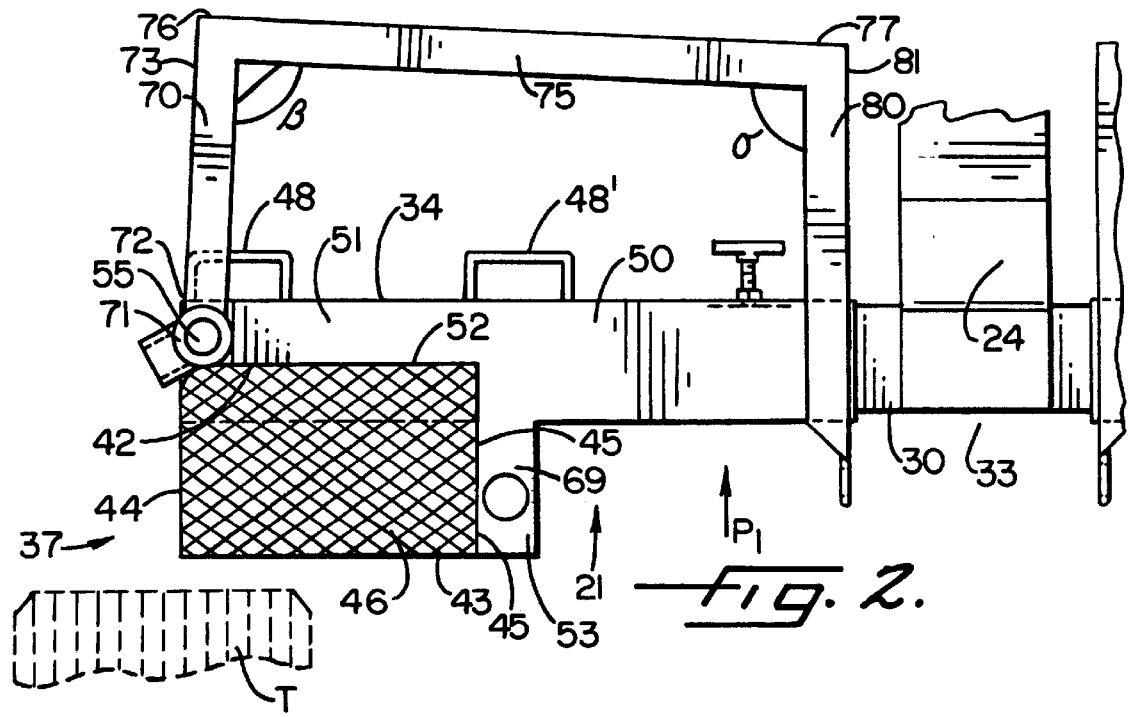
FIG. 2 is a top plan view of a portion of the wheel lift towing apparatus of FIG. 1 in a storage position.
Figure 3:
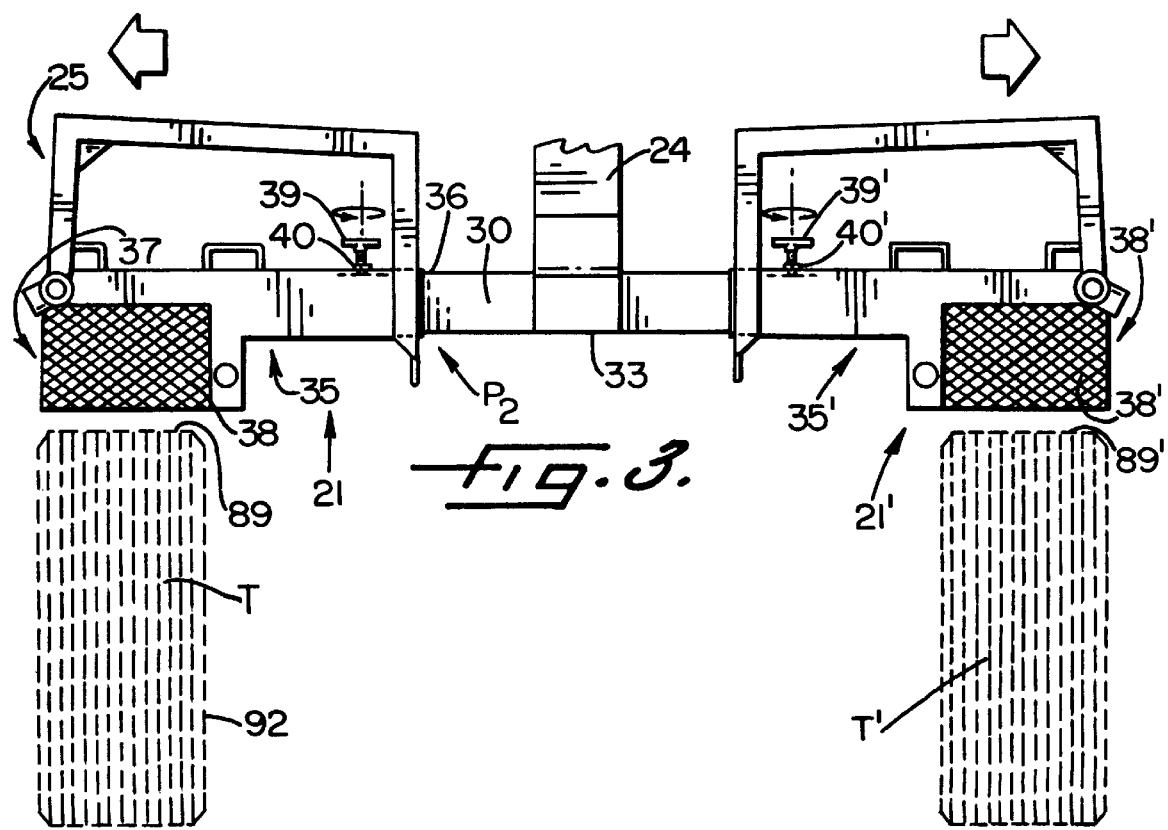
FIG. 3 is a top view of the wheel lift apparatus of FIG. 1 aligned with the tires of a vehicle for towing.

As illustrated in FIGS. 2 through 3, the wheel securing apparatus 21 can be moved among a plurality of positions, for example $P_1$ and $P_2$, along the length of cross arm 30 to align the wheel receiving position 37 of the wheel lift apparatus 20 with the tire T of a vehicle to be towed. In each of such positions $P_1$, $P_2$ the connecting portion 36 of the receiver 35 is a different distance from the medial portion 33 of the cross arm 30 along the longitudinal axis. Moving the receivers 35, 35' of the wheel securing apparatus 21 between this plurality of positions can align the wheel receiving portions 37, 37' of the receivers 35, 35 to secure the tires T or wheels of vehicles having a variety of spacing between the tires.

The wheel receiving portion 37 having the inclined face 38 is depicted in varying detail in FIGS. 1–6. The inclined face 38 is disposed at an angle α with relation to a face portion 50 of the cross arm 30 such that an upper portion 42 of the inclined face 38 which is closer to the rear of the truck V is at a higher elevation than a lower portion 43 (FIGS. 1 and 2). The inclined face has side edges 44 and 45 which are aligned generally normally to the axis of the cross arm 30 (FIG. 2). The side edges 44, 45 are generally of equal horizontal elevations at corresponding sections of the inclined face 38 at various equidistant positions normal to the cross arm 30 (FIG. 1). The inclined face 38 includes a surface 47 having a traction grid 46 which provides traction to assist in engaging the tire T of a vehicle during lifting and towing (FIG. 2). The inclined face 38 of the receiver 35 enables the wheel lift apparatus 20 to receive various sizes of tires T which can engage different portions of the inclined face 38.

Referring now to FIG. 2, the receiver 35 also includes a plurality of restraining rings 48, 48' for use in conjunction with the a restraining mechanism 66 illustrated in FIG. 6. These restraining rings 48 and 48' are placed along a proximal vertical face 34 of the wheel securing apparatus 21 facing the rear of the truck T. These restraining rings and other like restraining means can be utilized in a variety of positions on the wheel lift apparatus 20.

As depicted in FIGS. 1–6, the receiver 35 further includes a face portion 50 having a generally level elevation throughout. The face portion 50 includes a shelf portion 51 positioned on the face 50 of the receiver 35 adjacent a wall 52 of the wheel receiving portion 37 (FIGS. 2 and 6). The shelf portion 51 is preferably positioned between the wheel receiving portion 37 and the rear of the tow truck T (FIGS. 1 and 2). The shelf portion 51 is configured to receive the swing arm 25 in the towing position 29 as described with respect to FIGS. 5 and 6 herein. Various other configurations and placements of the shelf portion 51 can be provided on the wheel lift apparatus 20. The receiver 35 also includes a bar portion 53 which extends laterally from the longitudinal axis of the cross arm 30 (FIGS. 1 and 2). The bar portion 53 is positioned adjacent the side edge 45 of the wheel receiving portion 37 (FIG. 1). The upper surface 69 of the bar portion 53 forms a portion of the face portion 50 (FIG. 2) and serves to support the swing arm 25 in the towing position.

Still referring to FIGS. 1, 2 and 5. the pivot member 55 is mounted in the face portion 50 on an end portion 31 of the cross arm 30. The pivot member 55 includes a post which extends vertically normally from the face portion 50 and is positioned between the truck T and the wheel receiving portion 37.

As illustrated in FIGS. 2–5, the swing arm 25 is pivotally mounted on the pivot member 55. The swing arm 25 is pivotally mounted on the post of the pivot member 55 above the face portion 50 of the receiver 35 such that it can move between the storage position 26 shown in FIG. 2 and the towing position 29 in FIG. 5. The swing arm 25 includes a pivot receptacle 71 on a first end 72 of the swivel leg 70. The pivot receptacle 71 pivotally receives the pivot member 55 within the receptacle 71. The swivel leg 70 has a second end 73 which is connected with a end 76 of the wheel support leg 75.

The wheel support leg 75 extends, as depicted in FIG. 2, generally at an angle β to the swivel leg 70 which is preferably slightly greater than a 90 degree angle (FIG. 2). A second end 77 of the wheel support leg 75 is connected with a first end 81 of a distal leg 80. The distal leg 80 is depicted at an angle σ, which is preferably greater than 90 degrees with respect to wheel support leg 75 (FIG. 2). This arrangement is advantageous so as to enable the swing arm to engage tires having a variety of diameters and widths, and so that the end of the distal leg 80 more easily clears the tire T when the swing arm 25 is pivoted into the towing position. The placement of the pivot member 55 on the end 31 or outboard portion of the receiver 35 and cross arm 30 also facilitates the pivoting of the swing arm 25 by providing a swing angle for the distal leg 80 which easily clears the distal tread face 94 or edge of the tire T. Various configurations of the swing arm 25 can be provided having distal 80 and swivel legs 70 disposed at various angles with respect to the wheel support leg 75. Various other configurations of the swing arm can be included. The swing arm can be of different sizes and weights and strengths of materials to lift a variety of vehicles. As depicted, the wheel lift is depicted for use with passenger vehicles with conventional tow trucks.

Referring now to FIGS. 4–6, the distal arm 80, wheel support arm 75 and swivel arm 70 form a receptacle 103 configured to receive the tire T of a vehicle for lift towing. The distal leg 80 and the swivel leg 70 are preferably spaced apart defining a length of the receptacle 103 which is preferably less than the diameter of the tire T. As such, the tire T can be received and supported from below by the swing arm 25 in the receptacle 103 during lifting and towing in FIG. 6. The distal leg 80 extends to a second end portion 82 wherein a strap receiving ring 83 which is configured to receive a wheel securing mechanism 66 is mounted (FIG. 5).

The legs 70, 75 and 80 of the swing arm 25 are illustrated as integrally formed of steel or like metal. Other suitable materials having high strength and rigidity for bearing loads of vehicles in lifting and towing can be utilized. Such suitable materials having properties which enable them to withstand repeated loading and unloading, including normal and shear stresses, bending forces, and torque, without experiencing failure or excessive fatigue in use over time. Further, the swing arm can be form of materials which can endure various environmental conditions without deterioration.

As illustrated in FIGS. 3–6, the wheel lift apparatus further includes a lever receptacle 86 connected with the first end 72 of the swivel leg 70. The lever receptacle 86 preferably has a cylindrical wall which is configured to receive a lever bar 67 to assist in rotating the swing arm 25. The lever bar 67 facilitates access to the swing arm 25 for pivoting underneath the vehicle by an operator standing adjacent the vehicle to be towed. The lever bar 67 also increases the force applied in pivoting. The receptacle 86 and swing arm 25 are integrally formed but can be formed of multiple piece and materials. Other receptacles or pivot assistance means can be provided for pivoting the swing arm 25.

Referring again to FIGS. 2 and 3, the receiver 35 includes a hole 40 which receives a thumb screw 39. The threaded thumb screw 39 can be aligned with and inserted into the threaded hole 40 to engage the cross arm 30 within the hollow opening 41 of the receiver 35. The thumb screw 39 maintains the receiver 35 in fixed position with respect to the cross arm 30 during storage or during towing. Alternatively, the cross arm 30 can include a plurality of holes configured to receive the thumb screw 39 or other engaging means may be utilized to retain the cross arm 30 in a fixed position relative to the receiver 35. The wheel lift apparatus 20 can be utilized for towing a vehicle without necessitating the use of the thumb screw 39 to fix the receiver 35 with the cross arm 30.

Referring now to FIGS. 3–6, the operation of the wheel lift apparatus 20 and methods of wheel lift towing a vehicle utilized same are now described. FIG. 2 depicts a portion of the wheel lift apparatus 20 in the storage or transport position 26. The receiver 35 is positioned with the inward connecting portion 36 adjacent the boom 24 in the receiver storage position 90. The thumbscrew 39 can be used to retain the receiver in this receiver storage position 90 position. The swing arm 25 is located in the storage position 26 with the distal leg 80 adjacent and above the receiver 35 and cross arm 30. Also in this storage position, the wheel support leg 75 is preferably disposed generally spaced apart from the cross arm 30 in a position opposite the wheel receiving portion 37. The wheel support leg 75 preferably extends between the boom 24 and a respective one of the pivot members 55. Preferably, the wheel support leg 75 extends between a respective one of the end portion 31 and the boom 24 in a direction generally parallel to the cross arm 30. The swing arm 25 preferably closely abuts the boom 24 and is therefor restrained from pivoting when the receiver is in the receiver storage position 90 and the swing arm 30 is in the storage position 26 (FIG. 2). The swing arm 25 can be positioned in a plurality of alignments in the storage position 26, including with the distal leg 80 above the receiver 35 or with the wheel support leg 75 above the receiver 35. The swing arm 25 is restrained from pivoting or rotating in the storage position 26 such that the wheel lift apparatus 20 can be transported with the tow vehicle V as shown in FIGS. 1 and 2.

In FIGS. 3 and 4, the swing arm 25 is depicted in the storage position 26 such that the wheel lift apparatus 30 can be placed in proximity with the wheels T of the vehicle to be towed. The wheel lift apparatus 20 can be aligned and positioned adjacent the wheels T without requiring excessive setup. As depicted in FIG. 3, the wheel receiving portion 37 is accessible and can be aligned with the proximal tread face 89 of tire T in a vehicle alignment position by sliding the wheel securing apparatus 21 longitudinally away from the boom 24 and positioning the inclined face 38 adjacent the proximal tread face 89. The respective mirror elements of the wheel lift apparatus 20 included in wheel securing apparatus 21 can also be aligned and positioned with the proximal tread face 89' of the tire T (FIGS. 3 and 4). Alternately, a vehicle can be moved such that its tires T, T' are in position relative to the wheel lift apparatus 20 for towing.

Referring now to FIGS. 4 through 6, with the wheel T positioned on the inclined face 38 the swing arm 25 is pivoted from the storage position 26 into the towing position 29. A lever bar 67 is preferably inserted in the pivot receptacle to assist in such pivoting. Alternatively, the swing arm 25 can be rotated by simply rotating the swing arm 25 without utilizing the lever 67. The swing arm 25 is pivoted from the storage position 26 into a towing position 29 by pivoting the distal leg 80 around a side portion 92 of the tire facing the underside of the vehicle. The distal leg 80 preferably pivots beneath the underside of the vehicle V. The swing arm 25 is pivoted until the distal leg 80 is in the towing position 29 wherein the distal leg 80 is proximally adjacent to the distal tread face 94 of the tire T (FIG. 5). In the towing position 25, the distal leg 80 is preferably perpendicular to the boom 24 such that the opening of the receptacle which is defined between the end 82 of the distal leg 80 and the end 72 of the swivel leg 70 opposite the wheel support leg 75 is directed away from the boom 24. The distance between the distal leg 80 and the swivel leg 70 is preferably less than the diameter of the tire T. As such, the distal leg 80 preferably can pivot into proximity with the distal tread face 94 on the lower half of the tire (FIG. 6). The tire T can thereby be supported in the receptacle of the swing arm 25 on a lower half of the tire T.

In pivoting the swing arm 25 from the storage position 26 to the towing position 29, the swing arm 25 pivots above the face portion 50 of the receiver 35. The lateral bar portion 53 supports a portion of the wheel support leg 75 in the towing position 29 (FIG. 5). The swivel leg 70 is supported and extends along the shelf 51 of the face portion 50 in the towing position 29 (FIG. 5). The wheel lift apparatus 20 is thus preferably supported in two legs, the distal leg 80 and the wheel support leg 75 during lifting and towing. A forward edge 74 of the swivel leg 70 also abuttingly contacts the wall 52 of the wheel receiving portion 37 in the towing position 29 (FIGS. 5 and 6). When the swing arm 25 is pivoted, the wall 52 of the wheel receiving portion 37 retains the swing arm 25 in position during lifting and towing and prevents the swing arm 25 from rotating in the towing position 29. The wheel lift apparatus 20 thereby provides additional strength and load carrying capacity particularly to the swing arm 25 during lift towing. The swing arm 25 is retained in portion such that it will not cause interference with or damage to the rear surfaces of the tow vehicle V including the bumper during turning.

Referring to FIGS. 4 through 6, the swing arm 25 includes a plate 78 connected with and extending between the swivel leg 70 and the wheel support leg 75. The receiver 35 includes an overhead portion 79 having an opening which provides access to a cavity 102 within the hollow open portion of the receiver 35 (FIG. 6). When the swing arm 25 is pivoted, the plate 78 is received in the hollow opening and retained in the receiver 35 (FIG. 5). The plate 78 is received beneath the overhead portion 79. The plate is restrained from upward movement or further rotation during lifting and towing. The plate 78 also contacts the opening of the overhead portion 79 to retain the swing arm 25 in a fixed position relative to the receiver 35 during lifting and towing. The plate 78 also provides additional strength to the swing arm 25 during the lifting process strengthening function. Other configurations of plates or support mechanisms can be provided with the wheel lift apparatus 15.

With the swing arm 25 in the towing position 29 of FIGS. 5 and 6, wheel restraint mechanisms 66 can be utilized with the wheel lift apparatus 20. For example, the wheel retraining mechanism 66 is depicted as a strap 66 having a clip 106 on a first end connected with the ring 83 of the distal leg 80 and a hook 105 on an opposite end connected with one of the constraining rings 48, 48' of the receiver 35 (FIG. 6). The wheel restraint mechanism 66 includes a tensioning member 107 for adjusting tension of the mechanism 66 on the tire T. Other constraining wheel securing mechanisms can be utilized including various chains, straps, face covers or the like to retain the wheel within the receptacle of the swing arm.

Referring to FIG. 6, the wheel lift apparatus 20 can be raised to the towing position 29 such that tire T is preferably supported within the receptacle of the apparatus 20. The wheel lift apparatus 20 can be retained at a desired elevation above the ground during towing. The swing arm 25 is retained in the towing position 29, in part due to the load of the vehicle on the swing arm 25 and the positioning of the swing arm 25 on the face portion 50 of the cross arm 30 and adjacent to wheel receiving portion 37 including the wall 52 and wall 54 retains the swing arm in the towing position 29. The wheel lift apparatus 20 thereby provide additional stability for the swing arm 25 in this towing position. The tire T can also be secured in the receptacle with the securing mechanism 66.

The wheel lift apparatus 20 can then be utilized to tow a vehicle V secured therein to a remote location. The wheel lift apparatus 20 can then be lowered from the lifted towing position to the vehicle alignment position. The swing arm 25 can then be retracted to the storage position 26 such that the distal leg 80 pivots from a position adjacent the distal tread face 92 along the underside of the vehicle V until the distal leg 80 is proximately adjacent to the cross arm 30. These steps of the method of lifting a vehicle for towing can be repeated with the mirror elements of the wheel lift apparatus 20 to secure a pair of tires T for lift towing of a vehicle.

Referring to FIG. 7, the wheel lift apparatus 20 further includes releasable frame lifting mechanisms. The receiver 35 includes a receiving hole 68 configured to receive a frame lifting post 91 (FIGS. 7 and 8). The post 91 has a cylindrical steel body 93 having a lower portion with a diameter sized to be received in the hole 68 and an upper portion 96 having a diameter greater than the diameter of the receiving hole 68. The post 91 is thereby retained by the upper portion 96 in the hole 68 such that the upper portion 96 remains above the face portion 50 of the receiver 35. The upper portion 96 also includes a frame supporting member 98 which can be positioned under and support the frame of a vehicle during lifting. Such posts 91 can be utilized in place of the wheel securing apparatus 21. Various other post configurations and frame lifting mechanisms can be incorporated into the wheel lift apparatus.

Referring now to FIG. 9, an alternative embodiment of the wheel lifting apparatus 120 having a wheel securing apparatus 121 is depicted. The wheel lifting apparatus 120 includes the boom 24, cross arm 30 and general elements of the wheel securing apparatus 21. However, the inclined face 38 extends above the swivel leg 70 in the towing position. The extended inclined face 38 provides for positioning the tire T such that the swing arm 25 can be pivoted into position without the tire interfering or blocking the shelf 51 on which the swivel leg 70 pivots. The inclined face 38 can further alternatively be provide in various configurations including extending over the shelf of the bar 53 such that the wheel support leg 75 can pivot beneath the incline face 38 in the towing position, and to provide further structural support to the pivot member 55.

Figure 10:
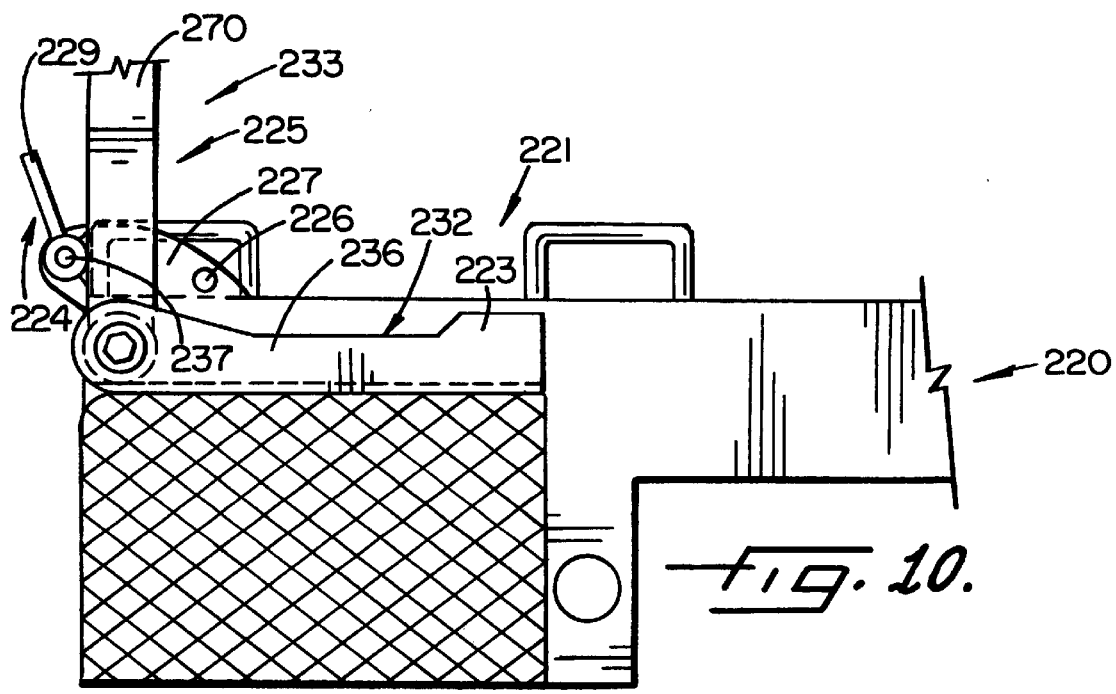
FIG. 10 is a top view of another alternative embodiment of a wheel securing apparatus of a wheel lift towing apparatus according to the present invention.
Figure 11:
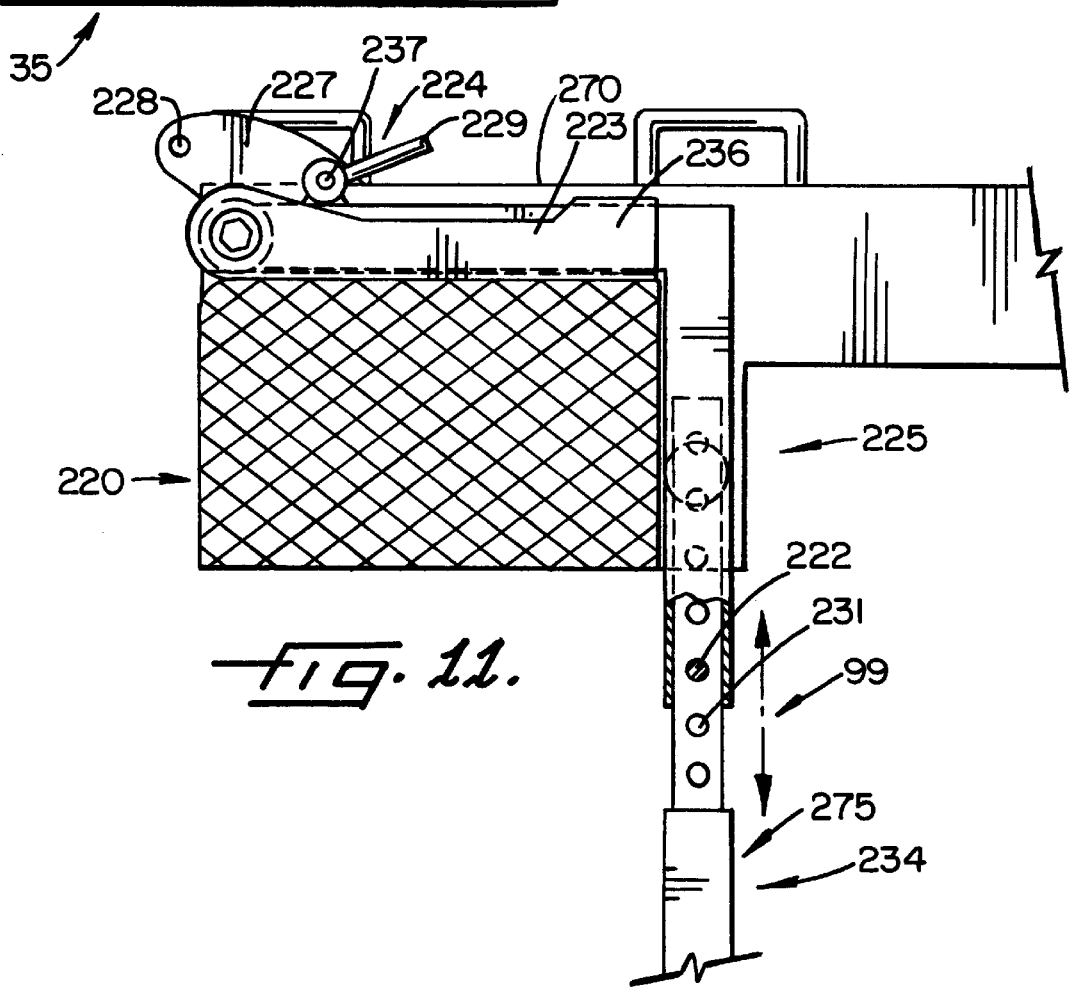
FIG. 11 is a top view of the wheel securing apparatus of the wheel lift towing apparatus of FIG. 10 in a towing position.

Referring now to FIGS. 10 and 11, a further alternative embodiment of a wheel lift towing apparatus 220 is illustrated. The wheel lift apparatus 220 includes a swing arm 225 having an adjustable leg portion 99 in the wheel support leg 275. The adjustable leg portion 99 can be provided in at least one of the swivel arm 270, distal leg 280, and/or wheel support leg 275. Such an adjustable leg portion 99 provides the swing arm 225 which can be sized to accommodate various diameters and widths of tires. The adjustable leg portion 99 can be moved between a plurality of positions to receive, support and lift a variety of sizes of tires T in the towing position 234. The swing arm 225 includes a pin 222 which is received into a hole 231 in the adjustable leg portion 99 to retain the adjustable leg portion 99 in a desired position providing a variety of lengths of the swing arm 225. The adjustable leg portion 99 can be provided in other configurations in swing arms which can receive a variety of shapes and sizes of tires.

The wheel lift apparatus 220 also includes a bracket 223 secured to the receiver 35 which includes an upper shelf 236, a lower shelf and a middle wall connected therebetween and thereby defining a c-shaped channel 232. The bracket 223 receives the swivel leg 270 in the c-shaped channel 232 of the swing arm 225 in the towing position (FIG. 11). The bracket 223 provides additional support to the swing arm 225 and restrains the swing arm 225 from vertically displacing or bending when subjected to loads and forces during lifting and towing. The bracket 223 is connected with the wall 52 of the wheel receiving portion 37. The bracket 223 can be provided with various other configurations, including channels of other shapes and configurations, and can be connected to other portions of the wheel securing apparatus 221.

Still referring to FIGS. 10 and 11, the wheel securing apparatus 221 also includes a locking plate 227 connected with the receiver 35 and positioned adjacent the swing arm 225 in the storage position 233 and the towing position 234. The locking plate 227 includes a storage locking hole 228 and a towing locking hole 226 which are configured to receive a locking mechanism 224 connected with the swing arm 225. The locking mechanism 224 is illustrated in FIGS. 10 and 11 as a spring-loaded pin 237 connected with a handle 229. The locking mechanism 224 is connected with the swing arm 225 such that the locking mechanism 224 moves with the swing arm 225 between the storage position 233 and the towing position 234 position. In the storage position 233, the pin 237 is received in the storage locking hole 228 in the locking plate 227 to retain the swing arm 225 in position (FIG. 10). The handle 229 can be grasped to remove the pin 237 from the hole 228. With the swing arm 225 in the towing position, the pin 237 is positioned in the towing locking hole 226 adjacent the swing arm 225 to retain the swing arm 225 in position (FIG. 11). The locking mechanism 224 further stabilizes and provides support to the swing arm 225 during lifting and towing. The holes 228 and 226 can be positioned in other places respective to the swing arm 225 to retain the swing arm 225 in a variety of positions including the storage position 233 and the towing position 234. Also, other configurations and types of locking mechanisms, as known to one of skill in the art can be provided to assist in retaining the swing arm 225 in position during storage, lifting and towing.

The wheel lift apparatus 20 can be utilized to lift and tow various vehicles, including cars, trucks, motorcycles, all terrain vehicles and other vehicles which can be wheel lift towed. For example, a motorcycle can be placed with a front wheel in one of the wheel securing apparatus 21. Further, the wheel securing apparatus 21 can be reconfigured to wheel lift a motorcycle by pivoting the cross arm and adjusting the positioning and size of the swivel leg to accommodate a motorcycle placed parallel to the cross arm. Further, the incline face can be rotated to be parallel to the cross arm instead of normal to accommodate a motorcycle.

The wheel lift apparatus thereby can be utilized with a variety of vehicles and can be positioned for lift towing without requiring extensive setup prior to alignment with the vehicle to be towed. Once aligned with the vehicle, the wheel of the vehicle can be secured in the wheel lift apparatus pivoting the swing arm 25. Therefore, the wheel lift apparatus 20 can be remotely positioned and aligned with a minimal time and effort in confirmed or dangerous spaces. As the wheel lift apparatus can be adapted for use with a variety of sizes and shapes of vehicle tires, the wheel lift apparatus 20 provides a flexible and easy manner of wheel lifting and towing such vehicles.

The wheel lift apparatus 20 can further be provided with a plurality of wheel securing apparatus 21 to lift and secure a plurality of tires of a vehicle V. For example, a wheel lift apparatus 20 can be provided having four wheel securing apparatus 21 for lifting and securing four tires of a vehicle V as described herein. Further, the wheel lift apparatus can be provided in other arrangements to lift and tow vehicles of other configurations.

In the drawings and specifications, there have been disclosed typical preferred embodiments of the invention and, although specific terms are employed, they are used in a generic and descriptive sense only and not for the purposes of limitation, the scope of the invention being set forth in the following claims.

That which is claimed:

1. A wheel lift apparatus for tow vehicles, comprising:
   a tow vehicle;
   a boom extending from the tow vehicle;
   means for lifting said boom;
   a cross arm having a medial portion attached to said boom and a pair of end portions on opposite sides of said medial portion for supporting wheels of a vehicle for towing;
   a pair of pivot members mounted on said pair of end portions; and
   a pair of swing arms mounted on said pivot members, each of said swing arms having a swivel leg, a wheel support leg and a distal leg, said swivel leg having a first end pivotally mounted to said pivot member and a second end connected to a first end of said wheel support leg, said wheel support leg further including a second end connected to said distal leg;
   said swing arms being pivotally movable between a storage position in which said swivel legs extend from said pivot members generally perpendicular to said cross arm in a direction towards said tow vehicle and said wheel support legs extend generally parallel to and on a tow vehicle side of cross arm between said boom and a respective one of said pivot members, and a towing position in which said swivel legs extend from said pivot members along said cross arm toward said boom such that said swivel legs overlie and are parallel to said cross arm, and in which said wheel support arms extend away from said tow vehicle and said cross arm from points intermediate said pivots and said boom, and in which said distal legs are spaced apart from said cross arm, such that in the towing position said cross arm, wheel support legs and distal legs define receptacles for receiving and supporting wheels of a vehicle for towing.

2. A wheel lift apparatus according to claim 1 in which each of said end portions of said cross arm includes a receiver having an inclined face for engaging a wheel.

3. A wheel lift apparatus as defined in claim 2, wherein each of said swivel legs is pivotally mounted with a respective one of said receivers at opposite lateral end portions of said cross arm.

4. A wheel lift apparatus as defined in claim 2, wherein each of said receivers is slidably received and movable between a receiver towing position and a receiver storage position along said cross arm.

5. A wheel lift apparatus as defined in claim 4, further comprising a pair of locking mechanisms, each of said locking mechanisms engages said cross arm such that a respective one said receivers is fixedly maintained with said cross arm in the receiver storage position.

6. A wheel lift apparatus as defined in claim 2, wherein said receivers each further comprise a wheel receiving portion including a respective one of said inclined faces configured to engage a portion of a wheel for lifting,
  wherein each of said swing arms is retained in the towing position by a respective one of said wheel receiving portions.

7. A wheel lift apparatus as defined in claim 6, wherein each of said wheel receiving portions is positioned between respective ones of said distal leg and a respective one of said swivel leg in the towing position.

8. A wheel lift apparatus as defined in claim 2, wherein each of said distal legs abuts said boom when a respective one of said swing arms is in the storage position and a respective one of said receivers is in the receiver storage position such that said swing arm is pivotally constrained in the storage position.

9. A wheel lift apparatus as defined in claim 2, wherein each of said receivers further comprises a bar portion extending laterally from said cross arm, and wherein each of said swing arms is supported on a respective one of said bar portions in the towing position.

10. A wheel lift apparatus as defined in claim 2, wherein each of said swivel legs and said wheel support legs is supported by a respective one of said receivers in said towing position.

11. A wheel lift apparatus as defined in claim 10, in combination with a lever connected with one of said receptacles.

12. A wheel lift apparatus as defined in claim 2, wherein each of said swing arms further comprises a plate extending between said swivel leg and said wheel support leg, and each of said receivers includes an overhead portion having an opening and a cavity connected with said opening, each of said plates is received in a respective one of said cavities beneath a respective one of said overhead portions of said receivers in the towing position to retain each of said swing arms during towing.

13. A wheel lift apparatus as defined in claim 2, further including an inclined face on each said receiver, each of which extends over a respective one of said pivot members and one of said swivel legs.

14. A wheel lift apparatus as defined in claim 2, wherein one of said distal legs, said swivel legs and said wheel support legs of said swing arms further comprises an adjustable leg portion movable between a plurality of positions such that said distal leg is spaced apart a plurality of distances from said receiver to accommodate various vehicle wheel sizes for towing.

15. A wheel lift apparatus as defined in claim 2, further comprising a pair of frame support posts, each of said support posts is releasably connected with and vertically extending from a respective one of said receivers for supporting a frame of a vehicle in towing.

16. A wheel lift apparatus as defined in claim 2, in combination with means for lifting said pair of receivers and said pair of swing arms between a lowered position and a raised towing position at an elevation above the ground suitable for towing a vehicle supported by said wheel lift apparatus.

17. A wheel lift apparatus according to claim 1, wherein in the storage position each of said wheel support legs extends between a respective one of said end portions and said boom in a direction generally parallel to said cross arm.

18. A wheel lift according to claim 1, wherein in the towing position each of said distal legs is generally perpendicular to said boom such that an opening of each of said receptacles is defined between said ends of said distal leg and said swivel leg opposite said wheel support leg and is directed open away from said boom.

19. A wheel lift apparatus as defined in claim 1, wherein each of said swing arms in the towing position is configured to engage and support a tire of a vehicle being towed such that each of said swing arms is retained in a respective one of the towing positions by a load of the tire.

20. A wheel lift apparatus as defined in claim 1, wherein each of said swing arms includes a proximal end having the receptacle adjacent a respective one of said mounting members, each of said receptacles is configured to receive a lever for pivoting said swing arm between the storage position and the towing position.

21. A wheel lift for tow vehicles, comprising:
  a tow vehicle;
  a boom extending from said tow vehicle;
  means for lifting said boom;
  a cross arm having a medial portion attached to said boom and a pair of end portions on opposite sides of said medial portion for support wheels of a vehicle for towing;
  a pair of pivot members mounted on said pair of end portions; and
  a pair of wheel receiving portions connected with said cross arm in opposite end positions thereof, each of said wheel receiving portions having an inclined face portion configured to receive a wheel for lifting, and
  a pair of swing arms each having a swivel leg connected by a wheel support leg to a distal leg, each of said swivel legs having a pivot end portion which is pivotally mounted on a respective one of said pair of pivot members,
  wherein each of said pair of swing arms is movable between a retracted storage position and a towing position such that in said retracted storage position each of said swivel legs extends generally perpendicular to said cross arm towards said tow vehicle and the wheel support leg is located on a tow vehicle side of the cross arm, and such that in said towing position each of said swivel legs extends interiorly along said cross arm from said pivot end portion and is parallel to and overlies said cross arm and each of said distal legs is spaced apart from said receiver such that each said distal leg and each said inclined face portion defines a receptacle for receiving and supporting a wheel of a vehicle for towing.

22. A wheel lift according to claim 21, wherein each of said swivel legs has a second end and wherein each of said pair of swing arms further comprises said wheel support leg connected between a respective end of one of said distal leg and said second end of swivel leg such that a respective one of said distal leg, said wheel support leg and said inclined face define said receptacle.

23. A wheel lift apparatus as defined in claim 21, wherein each of said wheel receiver positions comprises a receiver which is slidably received and movable between a receiver towing position and a receiver storage position along said cross arm.

24. A wheel lift apparatus as defined in claim 23, further comprising a pair of locking mechanisms, each of said locking mechanisms releasably engages said cross arm and a respective one of said receivers such that the respective one of said receivers is fixedly maintained with said cross arm in the receiver storage position.

25. A wheel lift apparatus as defined in claim 21, wherein each of said swing arms is configured to engage and support a load of a tire of a vehicle being towed such that each of said swing arms is retained in a towing position by the load of the tire.

26. A wheel lift apparatus as defined in claim 21, wherein each of said receivers further comprises a bar portion extending laterally from said cross arm, and wherein each of said swing arms is supported on a respective one of said bar portions in the towing position.

27. A wheel lift apparatus as defined in claim 21, wherein each of said swing arms includes a proximal end having a receptacle adjacent a respective one of said mounting members, each of said receptacles is configured to receive a lever for pivoting said swing arm between the storage position and the towing position.

28. A wheel lift apparatus as defined in claim 21, in combination with means for lifting said pair of wheel receiving positions and said pair of swing arms between a lowered position and a raised towing position at an elevation above the ground suitable for towing a vehicle supported by said wheel lift apparatus.

* * * * *